(12) United States Patent
Zhong

(10) Patent No.: US 10,823,908 B2
(45) Date of Patent: Nov. 3, 2020

(54) BACKLIGHT MODULE AND DISPLAY DEVICE

(71) Applicant: BEIJING XIAOMI MOBILE SOFTWARE CO., LTD., Beijing (CN)

(72) Inventor: Qiaowei Zhong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 33 days.

(21) Appl. No.: 16/194,975

(22) Filed: Nov. 19, 2018

(65) Prior Publication Data

US 2019/0154907 A1 May 23, 2019

(30) Foreign Application Priority Data

Nov. 20, 2017 (CN) .......................... 2017 1 1155913

(51) Int. Cl.
*F21V 8/00* (2006.01)
*G02F 1/1333* (2006.01)
*G02F 1/1335* (2006.01)

(52) U.S. Cl.
CPC ......... *G02B 6/0088* (2013.01); *G02B 6/0055* (2013.01); *G02B 6/0085* (2013.01);
(Continued)

(58) Field of Classification Search
CPC .. G02B 6/0015; G02B 6/0013; G02B 6/0033; G02B 6/0035; G02B 6/0061;
(Continued)

(56) References Cited

U.S. PATENT DOCUMENTS 6,481,130 B1 * 11/2002 Wu .......................... F21V 13/04
362/297
8,049,834 B2 * 11/2011 Mo .......................... G02B 6/005
349/58
(Continued)

FOREIGN PATENT DOCUMENTS

EP 2555025 A1 2/2013
GB 2546678 A 7/2017

OTHER PUBLICATIONS

Extended European search report of counterpart EP application No. 18207264.5 dated Jul. 10, 2019, 12 pages.
(Continued)

*Primary Examiner* — Jong-Suk (James) Lee
*Assistant Examiner* — James M Endo
(74) *Attorney, Agent, or Firm* — Arch & Lake LLP

(57) ABSTRACT

There is provided a backlight module and a display device. A light-emitting region of the backlight module has a size less than or equal to 7 inches. The backlight module includes a light source, a circuit board, a light guide plate and a target shielding light tape. The light source is disposed on a side surface of the light guide plate, a light-emitting side of the light source is next to the light guide plate, another side of the light source is welded with the circuit board being perpendicular to the light guide plate, and the target shielding light tape is located on a light-exiting surface of the light guide plate and covers the light source. The target shielding light tape is narrower, and the ratio of light-emitting region to the backlight module is larger, thereby improving the screen-to-body ratio of the portable terminal.

16 Claims, 2 Drawing Sheets

(52) U.S. Cl.
CPC ........ *G02F 1/133308* (2013.01); *G02B 6/005* (2013.01); *G02B 6/0081* (2013.01); *G02F 1/133512* (2013.01); *G02F 2001/133317* (2013.01); *G02F 2202/28* (2013.01)

(58) Field of Classification Search
CPC .. G02B 6/0066; G02B 6/0068; G02B 6/0073; G02B 6/0081; G02B 6/0085; G02B 6/0086; G02B 6/0088; G02B 6/0091; G02F 2001/133314; G02F 2001/133317; G02F 2001/13332; G02F 2001/133328; G02F 1/133615
USPC ............ 362/97.1–97.4, 600–634; 349/58–60
See application file for complete search history.

(56) References Cited

U.S. PATENT DOCUMENTS

| | | | | |
|---|---|---|---|---|
| 9,482,805 | B2 * | 11/2016 | Xiong | G02F 1/133308 |
| 2009/0086505 | A1 * | 4/2009 | Iwasaki | G02B 6/0041 |
| | | | | 362/612 |
| 2010/0165232 | A1 * | 7/2010 | Park | G02B 6/0051 |
| | | | | 349/58 |
| 2010/0253872 | A1 | 10/2010 | Park et al. | |
| 2010/0328580 | A1 * | 12/2010 | Kim | G02B 6/0073 |
| | | | | 349/64 |
| 2012/0002437 | A1 * | 1/2012 | Yabe | G02B 6/0028 |
| | | | | 362/606 |
| 2012/0162569 | A1 * | 6/2012 | Sekiguchi | G02F 1/133308 |
| | | | | 349/58 |
| 2012/0287355 | A1 * | 11/2012 | Oya | G02B 6/0031 |
| | | | | 348/790 |
| 2013/0063680 | A1 * | 3/2013 | Zhou | G09F 13/18 |
| | | | | 349/62 |
| 2013/0242224 | A1 * | 9/2013 | Yu | G02B 6/0085 |
| | | | | 349/58 |
| 2014/0003090 | A1 * | 1/2014 | Chang | G02B 6/0091 |
| | | | | 362/612 |
| 2014/0247398 | A1 * | 9/2014 | Kakimoto | G02B 6/0055 |
| | | | | 348/729 |
| 2014/0368769 | A1 | 12/2014 | Lee et al. | |
| 2015/0153609 | A1 | 6/2015 | Kim | |
| 2015/0241624 | A1 * | 8/2015 | Lo | G02B 6/0088 |
| | | | | 362/611 |
| 2015/0301272 | A1 * | 10/2015 | Chang | G02B 6/00 |
| | | | | 349/58 |
| 2016/0377799 | A1 * | 12/2016 | Park | G02B 6/0085 |
| | | | | 349/65 |

OTHER PUBLICATIONS

Partial European Search Report issued in corresponding European Application No. 18207264.5 dated Mar. 26, 2019, 13 pages.
Communication pursuant to Article 94(3) EPC of EP Application No. 18207264.5 dated May 18, 2020, (7p).

\* cited by examiner

BACKLIGHT MODULE AND DISPLAY DEVICE

CROSS REFERENCE TO RELATED APPLICATIONS

This application claims priority to Chinese Patent Application No. 201711155913.0, filed on Nov. 20, 2017 and titled "BACKLIGHT MODULE AND DISPLAY DEVICE," the entire contents of which are incorporated herein by reference.

TECHNICAL FIELD

The present disclosure relates to a backlight module and a display device.

BACKGROUND

With the development of science and technology, portable terminals (e.g., mobile phones) are used more and more extensively. In addition, people have increasingly demanded for the screen-to-body ratio of the portable terminals.

In the rated art, a portable terminal usually comprises a liquid crystal display panel and a backlight module that provides backlight for the liquid crystal display panel. Exemplarily, the backlight module comprises a light emitting diode (LED), a light guide plate, a flexible printed circuit (FPC) and a shielding light tape. The LED is disposed on a side surface of the light guide plate. A light emitting side of the LED is close to the light guide plate. The LED is welded with a FPC that is parallel to the light guide plate and has a large area, and the FPC is covered with a shielding light tape that shields the FPC.

Since the area of FPC in the related art is large, an area of shielding light tape that shields the FPC is also large. Moreover, the region in the backlight module, which is shielded by the shielding light tape, cannot emit light. Therefore, a ratio of light-emitting region to the backlight module is small, resulting in a small screen-to-body ratio of the portable terminal.

SUMMARY

The present disclosure provides a backlight module and a display device.

According to a first aspect of the present disclosure, there is provided a backlight module. A light-emitting region of the backlight module has a size less than or equal to 7 inches. The backlight module includes a light source, a circuit board, a light guide plate and a target shielding light tape; the light source is disposed on a side surface of the light guide plate, a light-emitting side of the light source is next to the light guide plate, another side of the light source is welded with the circuit board being perpendicular to the light guide plate, and the target shielding light tape is located on a light-exiting surface of the light guide plate and covers the light source.

According to a second aspect of the present disclosure, there is provided a display device. The display device includes the backlight module, where a light-emitting region of the backlight module has a size less than or equal to 7 inches; the light source is disposed on a side surface of the light guide plate, a light-emitting side of the light source is next to the light guide plate, another side of the light source is welded with the circuit board, and the circuit board is perpendicular to the light guide plate; the target shielding light tape is located on a light-exiting surface of the light guide plate and covers the light source.

DETAILED DESCRIPTION

The present disclosure will be described in further detail with reference to the enclosed drawings, to clearly present the principles, and advantages of the present disclosure. Apparently, the embodiments described are merely some embodiments of the present disclosure, and are not representative of all embodiments.

With the development of science and technology, portable terminals are more and more widely applied. A portable terminal usually includes a liquid crystal display panel and a backlight module configured to provide backlight for the liquid crystal display panel. Exemplarily, referring to FIG. 1, the backlight module in the related art may usually include a housing 101, an LED 102, an FPC 103, a light guide plate 104, an optical film 105 and a shielding light tape 106. The LED 102 is disposed on a side surface of the light guide plate 104. A light-emitting side of the LED 102 is next to the light guide plate 104. The FPC 103 is parallel to the light guide plate 104 and is welded on the LED 102. The shielding light tape 106 covers and shields the FPC 103.

Since the FPC 103 usually has a relatively larger area, the shielding light tape 106 that shields the FPC 103 also has a relatively larger area. A region W1 in the backlight module, which is shielded by the shielding light tape 106, cannot emit light. Therefore, a ratio of light-emitting region to the backlight module is small, resulting in a small screen-to-body ratio of the portable terminal.

Figure 2:
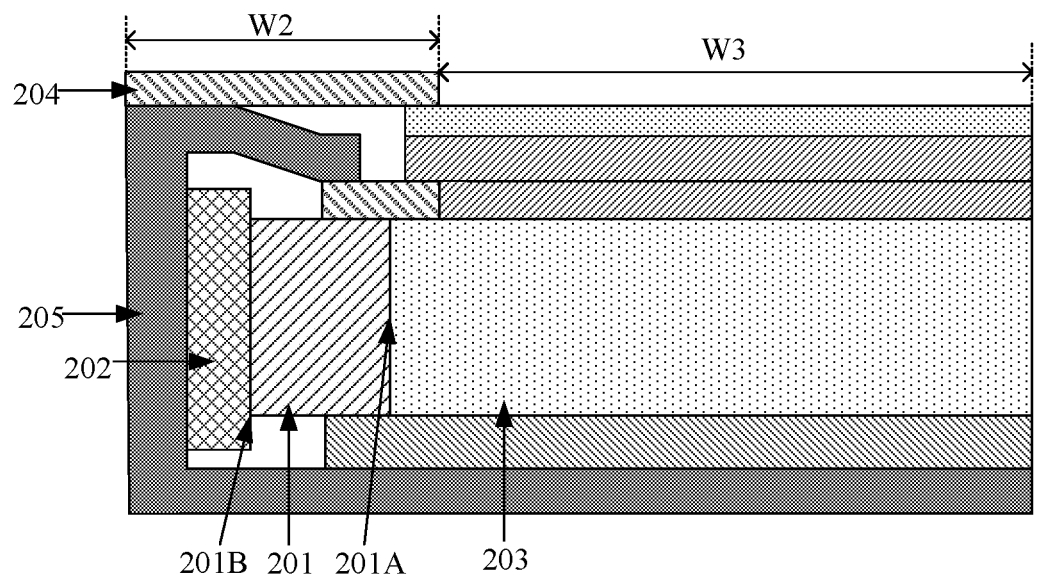
FIG. 2 is a partial schematic view a local structure of a backlight module provided by an example of the present disclosure.

FIG. 2 is a partial schematic view of a local structure of a backlight module provided by an example of the present disclosure. As shown in FIG. 2, the backlight module may include a light source 201, a circuit board 202, a light guide plate 203, and a target lightproof adhesive tap 204.

The light source 201 may be an LED, an organic light-emitting diode (OLED), or other light sources in addition to the LED and the OLED, which is not limited herein. The light source 201 is disposed on a side surface of the light guide plate 203. A light-emitting side 201A of the light source 201 is next to the light guide plate 203. Another side of the light source 201 is welded with the circuit board 202, and the circuit board 202 is perpendicular to the light guide plate 203. For example, in FIG. 2, the light-emitting side 201A is in direct contact with the light guide plate 203 and the backlight surface 201B is welded with the circuit board 202. The target shielding light tape 204 is located on a light-exiting surface of the light guide plate 203 and covers the light source 201.

It should be noted that the light guide plate is usually a cuboid. Among the six surfaces of the light guide plate, there are two surfaces having large areas and disposed opposite to each other. These two surfaces are respectively called a light-exiting surface and a backlight surface of the light guide plate. Light that enters into the light guide plate exits from the light-exiting surface of the light guide plate. Four surfaces of the light guide plate, except for the light-exiting surface and the backlight surface, may be called side surfaces of the light guide plate. In the present disclosure, the light source may be disposed on the side surfaces of the light guide plate. As shown in FIG. 2, the light source is disposed on a side surface of the light guide plate. In practice, the light source may also be disposed on at least one side surface of the light guide plate, which is not limited in the embodiments of the present disclosure.

It should be noted that the backlight module provided in the present disclosure can be applied in a display device having a small size of display region, such as a mobile phone, a tablet, a bracelet and the like. A light-emitting region of the backlight module has a size less than or equal to 7 inches. For example, when the backlight module has a rectangular shape, the light-emitting region of the backlight module may have a width or length between 1 inch and 7 inches, between 2 inches and 7 inches, between 3 inches and 7 inches, between 2 inches and 6 inches, between 1 inch and 2 inches, or the like. For another example, the light-emitting region of the backlight module may also have a width or length less than 6.5 inches, 6 inches, 5.5 inches, 5 inches, 4.5 inches, 4 inches, 3.5 inches, 3 inches, 2.5 inches, 2 inches, 1.5 inches, 1 inch or 0.5 inch. The diameter may be in a range between 0.2 inch and 0.5 inch, between 0.2 inch and 7 inches, between 0.5 inch and 7 inches, or the like. When the backlight module has a rectangular shape, the light-emitting region of the backlight module may, have a diameter between 1 inch and 7 inches, between 2 inches and 7 inches, between 3 inches and 7 inches, between 2 inches and 6 inches, between 1 inch and 2 inches, or the like. Alternatively, the light-emitting region of the backlight module may also have a diameter less than 6.5 inches, 6 inches, 5.5 inches, 5 inches, 4.5 inches, 4 inches, 3.5 inches, 3 inches, 2.5 inches, 2 inches, 1.5 inches, 1 inch or 0.5 inch. The diameter may be in a range between 0.2 inch and 0.5 inch, between 0.2 inch and 7 inches, between 0.5 inch and 7 inches, or the like. In short, the backlight module is suitable for a display device having a size of display region less than or equal to 7 inches. If a light-emitting region falls into a certain circle, then the light-emitting region is located in the circle.

Because FIG. 2 is a partial schematic view of the local structure of the backlight module, the light-emitting region W3 of the backlight module illustrated in FIG. 2 is only a part of the whole light-emitting region, rather than the whole light-emitting region of the whole backlight module.

To sum up, in the backlight module provided by the present disclosure, the circuit board is perpendicular to the light guide plate and located on a side of the light source away from the light guide plate. The target shielding light tape needs to shield the circuit board and the light source. Since the circuit board is perpendicular to the light guide plate in this example, the widths of the circuit board and the light source are relatively small. Thus, a region required to be shielded by the target shielding light tape in a display side of the backlight module is smaller, the target shielding light tape may be narrower, and the ratio of light-emitting region to the backlight module is larger, thereby improving the screen-to-body ratio of the portable terminal.

It should be noted that a direction of the width mentioned in the embodiments of the present disclosure is in a direction from the light guide plate to the light source.

Figure 1:
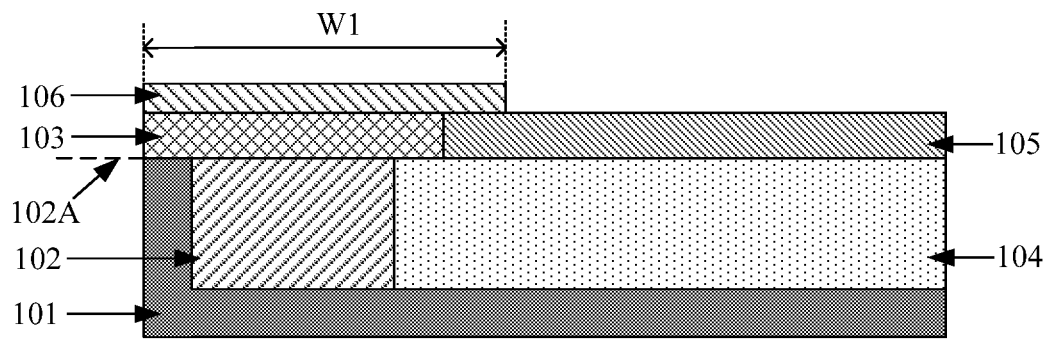
FIG. 1 illustrates a partial schematic view of a local structure of a backlight module according to the related art.

In addition, referring to FIG. 1, when the FPC 103 is welded on the LED 102 in the related art, a large solder (not shown in FIG. 1) needs to be provided between the FTC 103 and the LED 102, so as to guarantee an effective welding between the FPC 103 and the LED 102. Hence, it is necessary to set a surface 102A on the LED 102, which is in contact with the solder pad (i.e., a surface next to the shielding light tape of the LED), to be a surface with a large area, and the width of the LED 102 is usually greater than 1 mm.

However, as shown in FIG. 2, the circuit board 202 is disposed on a side of the light source 201 away from the light guide plate. A surface on the circuit board 202, which is in contact with a solder pad, is not a surface of the light source 201 next to the target shielding light tape 204. Therefore, the surface of the light source 201 next to the target shielding light tape 204 may be adaptively set to be a surface with a small width, so that the width of the light source 201 is small. Exemplarily, when the light source 201 is the LED, its width may be in the range of 0.2 mm to 0.5 mm, thereby further reducing a region W2 that needs to be shielded by the target shielding light tape on the display side of the backlight module, and improving the screen-to-body ratio of the portable terminal. For example, the width may be 0.4 mm in a device having a display area with a size of about 7 inches. The size may be the width, the length, or the diameter of the display area.

Furthermore, the circuit board 202 may be a thinner printed circuit board (also known as a thin printed circuit board). As a thickness of the thinner printed circuit board is less, thereby further reducing the region W2 required to be shielded on the display side of the backlight module and improving the screen-to-body ratio of the portable terminal.

Referring to FIG. 2 again, the backlight module may further include a heat-conducting housing 205. The light source 201, the circuit board 202, and the light guide plate 203 are all located in the heat-conducting housing 205. Exemplarily, the heat-conducting housing 205 may be made of a metal (such as aluminum, copper or iron). In practice, the heat-conducting housing 205 may also be made of other non-metallic heat conduction materials, such as carbon or graphite, which is not limited in the embodiments of the present disclosure. It should be noted that, when the backlight module is turned on to provide light, the light source 201 and the circuit board 202 may generate more heat. The generated heat may be conducted to the external environment through the heat-conducting housing 205, thereby achieving an effective heat dissipation.

Figure 3:
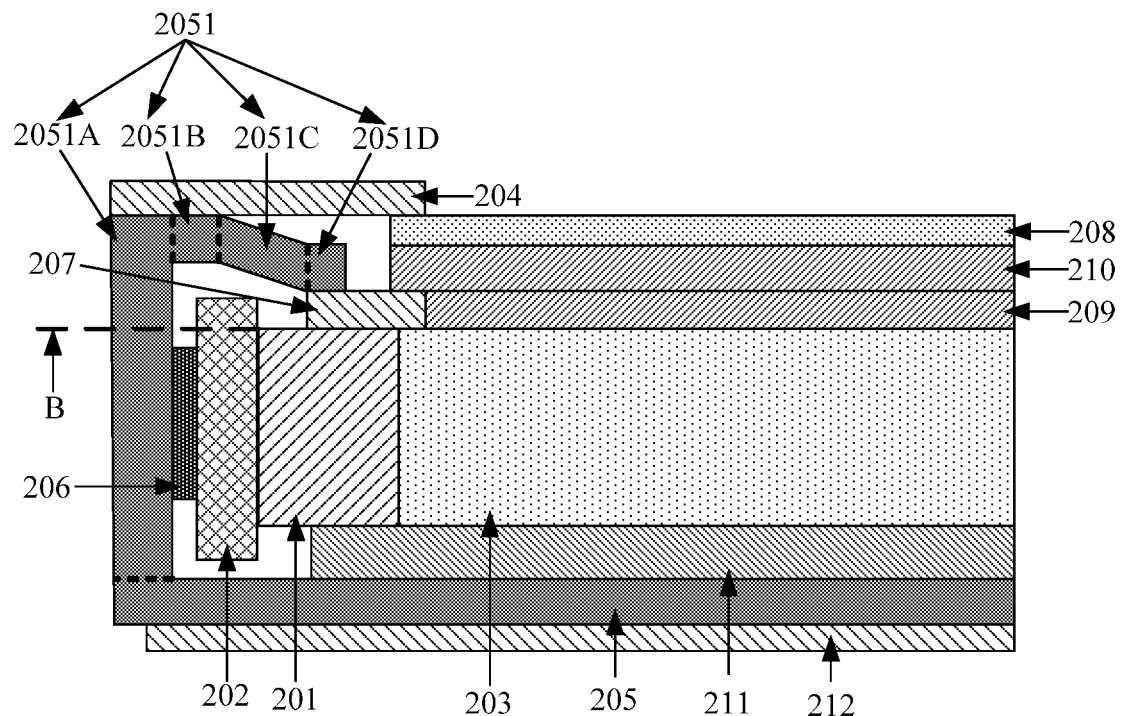
FIG. 3 is a partial schematic view of a local structure of another backlight module provided by an example of the present disclosure.

FIG. 3 is a partial schematic view of a local structure of another backlight module provided by a schematic example of the present disclosure. As shown in FIG. 3 and on a basis of FIG. 2, the backlight module may further include a thermally conductive adhesive 206, and the circuit board 202 may be connected to the heat-conducting housing 205 through the thermally, conductive adhesive 206. Exemplarily, the thermally conductive adhesive 206 may be thermally conductive silica gel. Since the thermally conductive adhesive 206 has good thermally conductive performance, and the circuit board 202 is connected to the heat-conducting housing 205 through the thermally conductive adhesive 206, the heat generated by the circuit board 202 and the light source 201 may be quickly and effectively conducted to the heat-conducting housing 205, thereby improving the heat dissipation effect of the backlight module.

Figure 4:
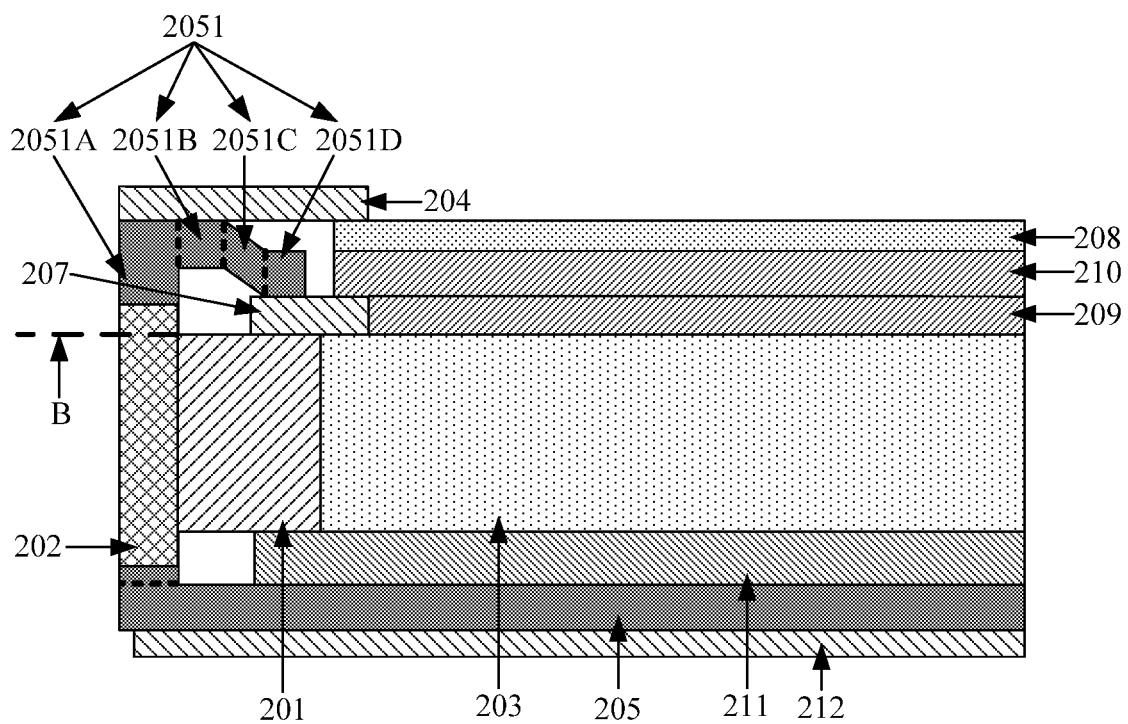
FIG. 4 is a partial schematic view of a local structure of yet another backlight module provided by an example of the present disclosure.

FIG. 4 is a partial schematic view of a local structure of another backlight module provided by an example of the present disclosure. As shown in FIG. 4 and on a basis of FIG.

2, a receiving hole (not shown in FIG. 4) is provided on a side of the heat-conducting housing 205 next to the circuit board 202. The circuit board 202 is located in the receiving hole and in contact with the heat-conducting housing 205. When the backlight module includes a heat-conducting housing, the target shielding light tape also needs to shield the heat-conducting housing. When the circuit board 202 is located in the receiving hole of the heat-conducting housing 205, the overall volume of the heat-conducting housing, the circuit board and the light source is small, thereby further reducing the width of the region shielded by the target shielding light tape in the backlight module and improving the screen-to-body ratio of the portable terminal.

Optionally, the receiving hole as shown in FIG. 4 may be a through hole, and the circuit board 202 may be embedded into the receiving hole. That is, the circuit board 202 may have a same shape and size as the receiving hole, and may be in full contact with a surface, which is encircled to form the receiving hole, on the heat-conducting housing when embedded into the receiving hole, such that the contact area between the circuit board 202 and the heal-conducting housing 205 is large and the heat conduction efficiency is high. In addition, when the receiving hole A is the through hole, a side of the circuit board 202 away from the light source 201 is exposed. Hence, the circuit board 202 can simultaneously dissipate heat through the eat-conducting housing 205 and the through hole.

Exemplarily, the circuit board 202 may be a printed circuit board. Compared with an FPC made of a soft material, the printed circuit board has a higher hardness and a stronger impact resistance. Besides, it is easier to place the harder printed circuit board in the receiving hole.

Optionally, as shown in FIG. 3 and FIG. 4, the backlight module may further include an auxiliary shielding light tape 207, an optical film 208, a first transparent isolation film 209, a second transparent isolation film 210 and a reflector plate 211.

The auxiliary shielding light tape 207 is located between the light guide plate 203 and the target shielding light tape 204. A plane where a light-exiting surface of the light guide plate 203 is located is a target plane B. An orthographic projection region of the auxiliary shielding light tape 207 on the target plane B is located within an orthographic projection region of the target shielding light tape 204 on the target plane B. In the embodiments of the present disclosure, by means of adding the auxiliary shielding light tape 207 between the light guide plate 203 and the target shielding light tape 204, the auxiliary shielding light tape 207 and the target shielding light tape 204 may effectively shield a non-light-emitting region of the backlight module, thereby improving the shading effect of the backlight module.

Optionally, the orthographic projection region of the auxiliary shielding light tape 207 on the target plane B may overlap with the light-exiting surface of the light guide plate 203. That is, the auxiliary shielding light tape 207 and the target shielding light tape 204 may shield the edge of the light guide plate 203.

Referring to FIG. 3 and FIG. 4 again, an edge of the heat-conducting housing 205 is provided with a bending portion 2051 that bends toward the inside of heat-conducting housing 205, and the bending portion 2051 includes a first platy structure 2051A, a second platy structure 2051B, a third platy structure 20510 and a fourth platy structure 2051D that are connected in sequence. The first platy structure 2051A is perpendicular to the light guide plate 203 and provided with a receiving hole. The second platy structure 2051B and the fourth platy structure 2051D are parallel to the target plant B. The fourth platy structure 2051D is disposed next to the light guide plate 203.

The auxiliary shielding light tape 207 and the first isolation film 209 are superimposed on the light guide plate 203. The auxiliary shielding light tape 207 is next to the light source 201. The fourth platy structure 2051D is superimposed on an end of the auxiliary shielding light tape 207 next to the light source 201. The second isolation film 210 is superimposed on the end of the auxiliary shielding light tape 207 away from the light source 201 and on the first isolation film 209. The optical film 208 is superimposed on the second isolation film 210. The target shielding light tape 204 is superimposed on the second platy structure 2051B and the optical film 208.

Referring to FIG. 3 and FIG. 4 again, the reflector plate 211 may be disposed on a side of the light guide plate 203 next to the heat-conducting housing 205. A plane where a light-exiting surface of the light guide plate is located is a target plane B. The light-exiting surface is located in an orthographic projection region of the reflector plate on the target plane B, and there is an overlapping region between an orthographic projection region of the light source 201 on the target plane B and an orthographic projection region of the reflector plate on the target plane B. That is, the reflector plate 211 may shield the whole reflector plate 203 and a light-emitting side of the light source 201, so as to prevent light emitted by the light source 201 to be exited from the backlight side of the light guide plate 203 and prevent the backlight module from light leakage.

Referring to FIG. 3 and FIG. 4 again, the backlight module may further include a back shielding light tape 212 disposed on a side of the heat-conducting housing 205 away from the light guide plate 203. Orthographic projection regions of the light guide plate 203 and the light source 201 on the target plane B are located within an orthographic projection region of the back shielding light tape 212 on the target plane B. That is, the back shielding light tape 212 may shield the whole light guide plate 203 and the light source 201, thereby further prevent the light emitted by the light source 201 to be exited from the backlight side of the light guide plate 203 and prevent the backlight module from light leakage.

Optionally, the back shielding light tape 212 may shield the whole circuit board 202 (as shown in FIG. 3) or part of the circuit board 202 (as shown in FIG. 4).

To sum up, in the backlight module provided by the present disclosure, the circuit board is perpendicular to the light guide plate and located on a side of the light source away from the light guide plate. The target shielding light tape needs to shield the circuit board and the light source. Besides, since the circuit board is perpendicular to the light guide plate at this moment, both the widths of the circuit board and the light source are small. Therefore, a region required to be shielded by the target shielding light tape in a display side of the backlight module is smaller, the target shielding light tape is narrower, and the ratio of light-emitting region to the backlight module is larger, thereby improving the screen-to-body ratio of the portable terminal.

An example of the present disclosure provides a display device which may include a backlight module shown in any one of FIGS. 2 to 4.

The display device may further include a liquid crystal display panel with a size of a display region less than or equal to 7 inches. The backlight module is disposed on a light incident side of the liquid crystal display panel and configured to provide backlight for the liquid crystal display panel.

Exemplarily, the display device may be products or components having a display function, for example, a liquid crystal display device, a mobile phone, a tablet a display, a digital photo frame, a navigator, or the like.

Other embodiments of the present disclosure may be available to those skilled in the art upon consideration of the specification and practice of the invention disclosed herein. The present application is intended to cover any variations, uses, or adaptations of the present disclosure following general principles of the present disclosure and include the common general knowledge or conventional technical means in the art without departing from the present disclosure. The specification and examples are merely shown as illustrative, and the scope and spirit of the disclosure are indicated by the following claims.

The technical solutions provided by the present disclosure may include the following beneficial effects: in the backlight module provided by the present disclosure, the circuit board is perpendicular to the light guide plate and located on the side of the light source away from the light guide plate. The target shielding light tape needs to shield the circuit board and the light source. Since the circuit board is perpendicular to the light guide plate at this moment, the widths of the circuit board and the light source are both small. Therefore, a region required to be shielded by the target shielding light tape in a display side of the backlight module is smaller, the target shielding light tape is narrower, and the ratio of light-emitting region to the backlight module is larger, thereby improving the screen-to-body ratio of the portable terminal.

It should be understood that, this disclosure is not limited to the precise constructions described above and shown in the enclosed drawings, and various modifications and changes may be made without departing from the scope of the present disclosure which is limited only by the appended claims.

What is claimed is:

1. A backlight module, comprising:
   a light source, a circuit board, a light guide plate, and a target shielding light tape, wherein a light-emitting region of the backlight module has a size less than or equal to 7 inches, and
   wherein the light source is disposed in direct contact with a side surface of the light guide plate, a light-emitting side of the light source is next to the light guide plate, another side of the light source is welded with the circuit board, and the circuit board is perpendicular to the light guide plate and is welded with the side of the light source away from the light guide plate; the target shielding light tape is located on a light-exiting surface of the light guide plate and covers the light source;
   an auxiliary shielding light tape located between the light guide plate and the target shielding light tape, wherein a plane where a light-exiting surface of the light guide plate is located is a target plane; an orthographic projection region of the auxiliary shielding light tape on the target plane is located within an orthographic projection region of the target shielding light tape on the target plane;
   a heat-conducting housing, wherein the light source, the circuit board and the light guide plate are all located in the heat-conducting housing; and
   an optical film, a first transparent isolation film, and a second transparent isolation film,
   wherein an edge of the heat-conducting housing is provided with a bending portion that bends toward the inside of the heat-conducting housing, and the bending portion comprises a first platy structure, a second platy structure, a third platy structure and a fourth platy structure that are connected in sequence,
   wherein the first platy structure is perpendicular to the light guide plate; the second platy structure and the fourth platy structure are parallel with the target plane; the fourth platy structure is next to the light guide plate, and
   wherein the auxiliary shielding light tape and the first isolation film are superimposed on the light guide plate, and the auxiliary shielding light tape is next to the light source; the fourth platy structure is superimposed on an end of the auxiliary shielding light tape next to the light source; the second isolation film is superimposed on an end of the auxiliary shielding light tape away from the light source, and on the first isolation film; the optical film is superimposed on the second isolation film; and the target shielding light tape is superimposed on the second platy structure and the optical film.

2. The backlight module according to claim 1, further comprising a thermally conductive adhesive, and the circuit board is connected to the heat-conducting housing through the thermally conductive adhesive.

3. The backlight module according to claim 2, wherein a side of the heat-conducting housing next to the circuit board is provided with a receiving hole; the circuit board is located in the receiving hole and is in contact with the heat-conducting housing.

4. The backlight module according to claim 3, wherein the receiving hole is a through hole, and the circuit board is embedded into the receiving hole.

5. The backlight module according to claim 2, wherein a side of the heat-conducting housing next to the circuit board is provided with a receiving hole; the circuit board is located in the receiving hole and is in contact with the heat-conducting housing.

6. The backlight module according to claim 5, wherein the receiving hole is a through hole, and the circuit board is embedded into the receiving hole.

7. The backlight module according to claim 2, further comprising a reflector plate,
   wherein the reflector plate is disposed on a side of the light guide plate next to the heat-conducting housing;
   a plane where a light-exiting surface of the light guide plate is located is a target plane; the light-exiting surface is in an orthographic projection region of the reflector plate on the target plane; and
   wherein there is an overlapping region between an orthographic projection region of the light source on the target plane and an orthographic projection region of the reflector plate on the target plane.

8. The backlight module according to claim 1, wherein the circuit board includes a printed circuit board (PCB).

9. A display device, comprising: a backlight module, wherein the backlight module comprises a light source, a circuit board, a light guide plate, and a target shielding light tape, wherein a light-emitting region of the backlight module has a size less than or equal to 7 inches, and
   wherein the light source is disposed in direct contact with a side surface of the light guide plate, a light-emitting side of the light source is next to the light guide plate, another side of the light source is welded with the circuit board, and the circuit board is perpendicular to the light guide plate and is welded with the side of the light source away from the light guide plate; the target shielding light tape is located on a light-exiting surface of the light guide plate and covers the light source;

an auxiliary shielding light tape located between the light guide plate and the target shielding light tape, wherein a plane where a light-exiting surface of the light guide plate is located is a target plane; an orthographic projection region of the auxiliary shielding light tape on the target plane is located within an orthographic projection region of the target shielding light tape on the target plane, a heat-conducting housing, wherein the light source, the circuit board and the light guide plate are all located in the heat-conducting housing; and an optical film, a first transparent isolation film, and a second transparent isolation film, wherein an edge of the heat-conducting housing is provided with a bending portion that bends toward the inside of the heat-conducting housing, and the bending portion comprises a first platy structure, a second platy structure, a third platy structure and a fourth platy structure that are connected in sequence, wherein the first platy structure is perpendicular to the light guide plate; the second platy structure and the fourth platy structure are parallel with the target plane; the fourth platy structure is next to the light guide plate, and wherein the auxiliary shielding light tape and the first isolation film are superimposed on the light guide plate, and the auxiliary shielding light tape is next to the light source; the fourth platy structure is superimposed on an end of the auxiliary shielding light tape next to the light source; the second isolation film is superimposed on an end of the auxiliary shielding light tape away from the light source, and on the first isolation film; the optical film is superimposed on the second isolation film; and the target shielding light tape is superimposed on the second platy structure and the optical film.

10. The display device according to claim 9, further comprising a thermally conductive adhesive, and the circuit board is connected to the heat-conducting housing through the thermally conductive adhesive.

11. The display device according to claim 10, wherein a side of the heat-conducting housing next to the circuit board is provided with a receiving hole; the circuit board is located in the receiving hole and is in contact with the heat-conducting housing.

12. The display device according to claim 11, wherein the receiving hole is a through hole, and the circuit board is embedded into the receiving hole.

13. The display device according to claim 9, wherein a side of the heat-conducting housing next to the circuit board is provided with a receiving hole; the circuit board is located in the receiving hole and is in contact with the heat-conducting housing.

14. The display device according to claim 13, wherein the receiving hole is a through hole, and the circuit board is embedded into the receiving hole.

15. The display device according to claim 9, further comprising a reflector plate,
   wherein the reflector plate is disposed on a side of the light guide plate next to the heat-conducting housing;
   wherein a plane where a light-exiting surface of the light guide plate is located is a target plane; the light-exiting surface is in an orthographic projection region of the reflector plate on the target plane; and
   wherein there is an overlapping region between an orthographic projection region of the light source on the target plane and an orthographic projection region of the reflector plate on the target plane.

16. The display device according to claim 9, wherein the circuit board includes a printed circuit board (PCB).

\* \* \* \* \*